(12) United States Patent
Smith et al.

(10) Patent No.: US 6,359,642 B1
(45) Date of Patent: Mar. 19, 2002

(54) PRINTER CONTROL SYSTEM

(75) Inventors: Kenneth K. Smith; Arlin R. Jones, both of Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/238,963

(22) Filed: Jan. 27, 1999

(51) Int. Cl.⁷ .......................... B41J 2/435; G03G 15/00
(52) U.S. Cl. ......................................... 347/247; 399/87
(58) Field of Search ............................ 347/3, 40, 102, 347/248, 156, 247; 358/501, 401, 442, 468, 1.15, 1.12; 399/85, 87, 81, 82

(56) References Cited

U.S. PATENT DOCUMENTS

| | | | |
|---|---|---|---|
| 5,500,667 A | * 3/1996 | Schwiebert et al. | 347/102 |
| 5,699,495 A | * 12/1997 | Snipp | 358/1.15 |
| 5,850,245 A | * 12/1998 | Goto et al. | 347/156 |
| 5,949,450 A | * 9/1999 | Elley et al. | 347/40 |
| 6,012,792 A | * 1/2000 | Sievert et al. | 347/3 |
| 6,026,258 A | 2/2000 | Fresk et al. | 399/87 |
| 6,046,816 A | * 4/2000 | Rawal et al. | 358/1.12 |

FOREIGN PATENT DOCUMENTS

| | | | |
|---|---|---|---|
| JP | 2-027865 | 1/1990 | B41J/29/38 |
| JP | 8-167956 | * 6/1996 | B41J/29/38 |

* cited by examiner

*Primary Examiner*—Hai Pham
(74) *Attorney, Agent, or Firm*—Matthew L. Wade

(57) ABSTRACT

The present disclosure describes techniques that can be used to reduce the time required for a printer or printing system to generate printed output. Printers are provided that operate to move from an idle mode into a print mode upon receiving a PRE-START signal. Printers are also provided that operate to remain in a print mode for an extended period of time upon receiving a PRE-START signal. The PRE-START signal is a signal that indicates one or more "pre-print" acts have been performed. In addition, printing systems are provided that include peripheral devices adapted to transmit a PRE-START signal to a printer upon the detection of one or more PRE-PRINT acts.

3 Claims, 3 Drawing Sheets

PRINTER CONTROL SYSTEM

BACKGROUND OF THE INVENTION

For purposes of this application, the term "printer" refers to any device capable of placing a mark onto a page. In addition, the phrase "printing system" refers herein to any computer system that enables a user to generate printed output. The phrase "print output time" refers to the amount of time required for a printer to convert a print job into a printed form. This time period is measured from when the print job is received by the printer until when the printed form is available to the user. It can be seen that print output time can be an important measure of printer performance as it can affect user productivity.

Printers often can operate in an "idle mode" and in a "print mode". For purposes of this application, a printer is referred to as being in a print mode if it is presently ready to place marks on a page. In addition, a printer is referred to as being in an idle mode if a warm-up operation is presently required for the printer to move into a print mode.

One reason that printers are designed to operate in an idle mode is to reduce the printer's power consumption during periods when the printer is inactive (i.e., when the printer is not used for printing). Consider, for example, a typical laser printer that employs a standard electrophotography drum (drum), a laser mirror, a laser mirror drive unit (drive unit) and a heating element for transferring heat to toner. While in a print mode, power is applied to the drive unit so as to cause the laser mirror to rotate at a pre-determined velocity. During a printing operation, a laser beam is reflected by the rotating mirror so as to scan an image onto the drum. In addition, power is applied to the heating elements so as to generate a heating source for liquefying toner. Typically, in order to reduce power consumption, laser printers are designed to move into an idle mode (also commonly referred to as a "power save" state) when inactive over a certain period of time. While the laser printer is operating in the idle mode, power is reduced or removed from the drive unit and the heating elements. Therefore, the laser mirror will typically cease to rotate and the heating element temperature moves below that required for liquefying toner. After entering the idle mode, in order for the laser printer to move back into a print mode, a warm-up operation is typically required. The warm-up operation in this case is associated with re-application of power to the drive unit and heating elements. In addition, the warm-up operation is associated with allowing the laser mirror to reach the required rotational velocity and for the heating elements to reach the required temperature.

Prior art printers when operating in an idle mode typically initiate a warm-up operation only after receiving a print job and after some fixed amount of data from the print job has been processed. The print output time for a printer operating in an idle mode, therefore, is approximately the time required to perform the warm-up operation (warm-up time) plus the time required to perform the printing operation after the warm-up operation is complete.

SUMMARY OF THE INVENTION

A printer is provided that is capable of operating in either a print mode or in an idle mode. The printer includes a print engine, a communication interface and a control unit. The communication interface is adapted to receive a PRE-START signal indicating at least one PRE-PRINT act has been performed. The control unit is adapted to control the operational mode in which the printer operates and is responsive to the communication interface receiving the PRE-START signal when the printer is operating in an idle mode, by moving the printer from the idle mode to the print mode. The printer could be, for example, a laser printer. In addition, the printer can also include a scanner device that is connected to the communication interface and adapted to detect the performance of one or more PRE-PRINT acts. The scanner device can include, for example, an in-feed tray and one of the PRE-PRINT acts can include the loading of a page into the in-feed tray.

A printing system is provided that includes a printer that has an idle mode and a print mode of operation. The printing system further includes a device that can be used to generate and to submit a print job to the printer. The device is adapted to detect the performance of a PRE-PRINT act and is responsive thereto by transmitting a PRE-START signal to the printer. The printer, if operating in an idle mode upon receiving the PRE-START signal, responds to receiving the PRE-START signal by moving into the print mode. The printer could be, for example, a laser printer. The device could be, for example, a personal computer or a scanner.

A method is provided for controlling whether the printer operates in a print mode or in an idle mode. The method includes the following steps: receiving a PRE-START signal; and, if the printer is operating in the idle mode when the receiving step is performed, then moving the printer into the print mode. In addition, if the printer is operating in the print mode and inactive when the receiving step is performed, then a time is extended that the printer remains in the print mode while inactive before moving into the idle mode.

DESCRIPTION OF THE DRAWINGS

A more thorough understanding of the invention may be had from the consideration of the following detailed description taken in conjunction with the accompanying drawings in which.

DETAILED DESCRIPTION OF THE INVENTION

Figure 1:
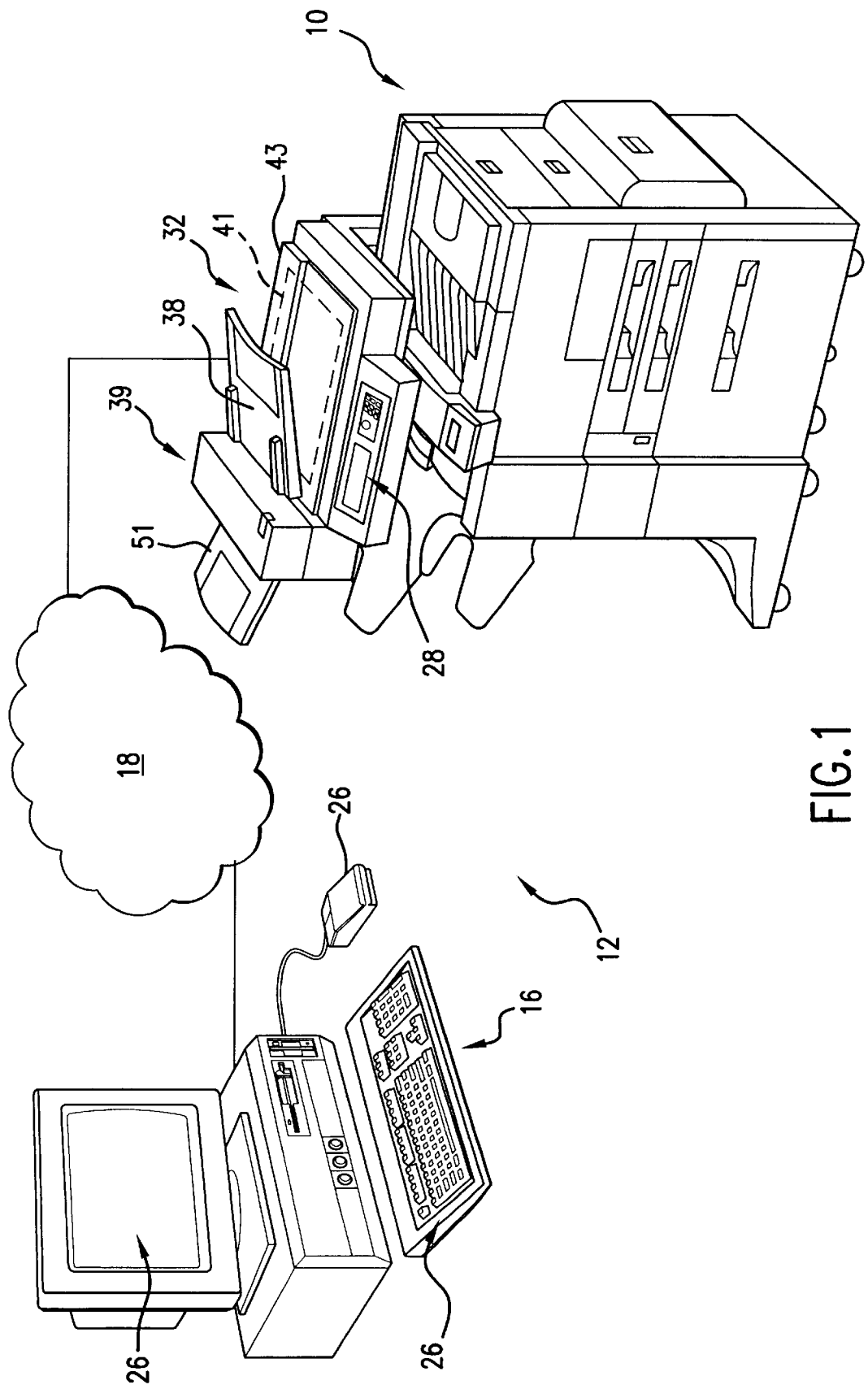
FIG. 1 is a perspective view of a printing system incorporating an embodiment of the present invention.

In many printing systems, certain acts are often performed, prior to a printer in the printing system receiving a print job, that are associated with the generation or transmission of the print job to the printer. For ease of discussion, these acts are generally referred to herein as "PRE-PRINT acts". As this disclosure will show, moving a printer from an idle mode to a print mode upon the performance of a PRE-PRINT act can result in reducing print output time. To illustrate this, attention is first directed to FIG. 1 wherein a first embodiment of the present invention is depicted in the form of Printing System 12.

As shown, Printing System 12 includes Printer 10 and various peripheral devices. These peripheral devices include a general purpose personal computer (Computer 16) and a Scanner Device 32. It is noted that in this embodiment, Scanner Device 32 is treated as a separate peripheral device. It is noted, however, that Scanner Device 32 and Printer 10 can optionally be referred to together as the "printer" in the printing system.

In general, Computer 16 enables a user to generate and to submit print jobs to Printer 10 for printing over Network 18. Scanner Device 32 enables a user to generate print jobs from printed documents and to submit these print jobs to Printer 10 for printing over a standard communication link, such as an internal serial bus.

Figure 2:
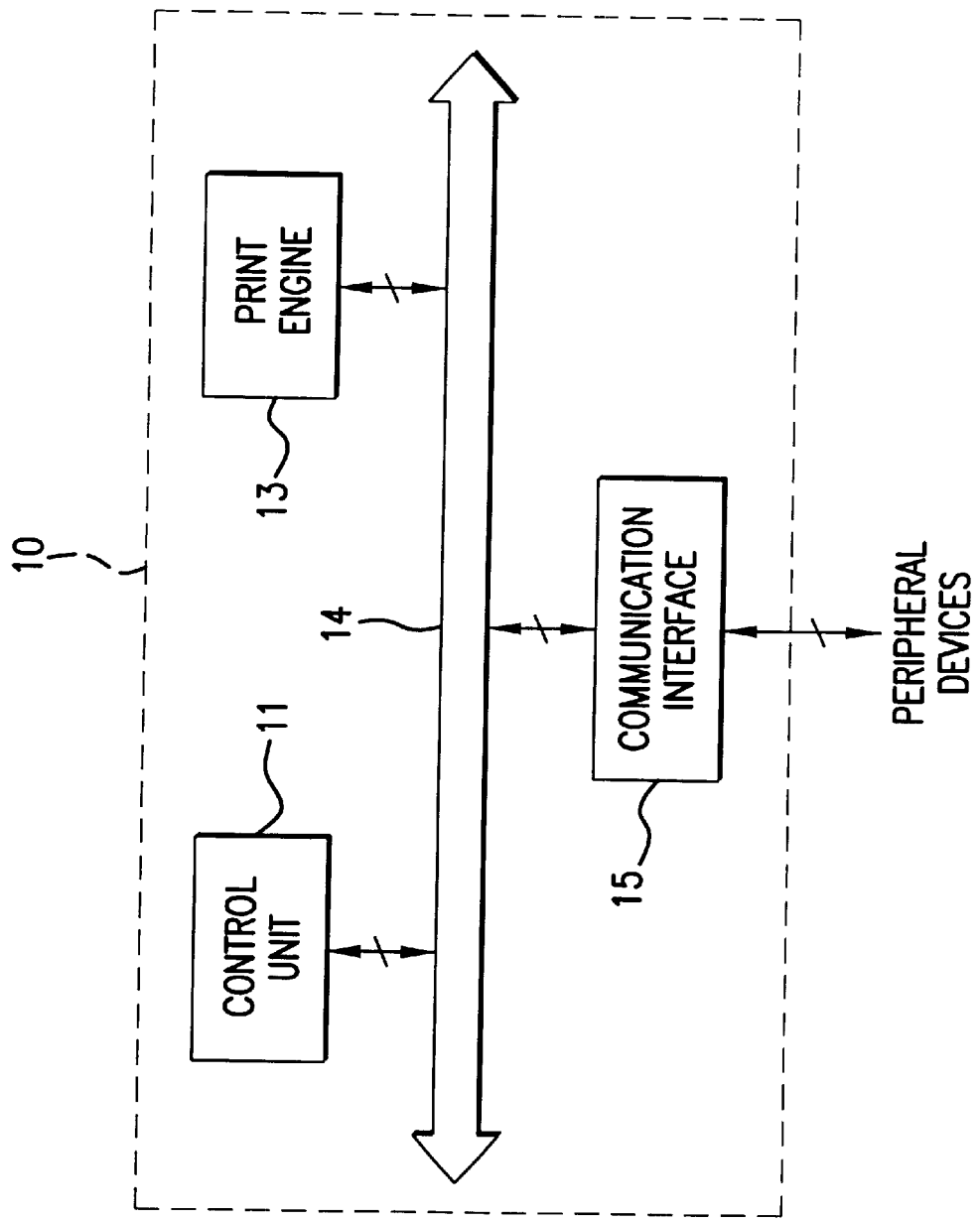
FIG. 2 is a high level functional block diagram of a printer incorporating an embodiment of the present invention.

Turning now to FIG. 2, certain internal components of Printer 10 are shown represented in the form of high-level functional blocks. As shown, Printer 10 includes Control Unit 11, Print Engine 13 and Communication Interface 15 all interconnected via Bus 14. Print Engine 13 provides Printer 10 with print output capability. Print Engine 13 could be a laser print engine employing, for example, a standard electrophotography drum imaging system. It is understood, however, that the present invention can also be incorporated into printers that employ other types of print engines, such as an ink jet, daisywheel, dot matrix or thermal print engine. Communication interface 15 enables Printer 10 to receive signals and print jobs from Computer 16 over Network 18. Communication Interface 15 further enables Printer 10 to receive signals and print jobs from Scanner Device 32 over the internal serial bus.

Control unit 11 controls various functions of Printer 10 including the mode in which Printer 10 operates. Under the direction of Control Unit 11, Printer 10 can operate in either a print mode or in an idle mode. When in a print mode, Control Unit 11 operates in a standard manner to move Printer 10 into an idle mode if Printer 10 is inactive over a certain period of time. When Printer 10 is in an idle mode, Control Unit 11 responds in a standard manner to Communication Interface 15 receiving a print job by initiating a warm-up operation in order to move Printer 10 into a print mode.

In addition, and in accordance with the present invention, when Printer 10 is in an idle mode, Control Unit 11 responds to Communication Interface 15 receiving a "PRE-START signal" by initiating a warm-up operation in order to move Printer 10 into the print mode. In general, a PRE-START signal is any signal or set of signals that indicate one or more PRE-PRINT acts have been performed.

To illustrate some examples of how the PRE-START signal can be generated and used to reduce print output time, consideration is first given to the operation of Computer 16. In this embodiment, Computer 16 is assumed to include software that enables a user to generate and to submit print jobs to Printer 10 for printing. This software can include operating software, application software, and print driver software. Computer 16 further includes various hardware components that form User Interface 26. As shown, User Interface 26 includes a standard keyboard, a pointing device (e.g., a mouse) and a monitor. As a result of Computer 16 executing the operating software and application software, a graphical user interface (GUI) is displayed onto the monitor.

It is assumed that the application software provides word processing functionality. For example, the application software could be MICROSOFT WORD [MICROSOFT is a trademark of the Microsoft corporation]. In order to print from the application software, it is assumed that the user can interact with Computer 16 in a standard manner to cause the GUI to display a print dialog box. After launching the print dialog box, the user can then respond by choosing a print command option from the dialog box. As a result, Computer 16 then executes the print command by converting the current document being displayed by the application software into a print job and then transmitting the print job to Printer 10 for printing.

Therefore, a user can perform one or more of the following acts to operate Computer 16 in order to cause Computer 16 to submit a print job to Printer 10 for printing:

Act #1: Launching the application software;
Act #2: Retrieving a document stored in Computer 16;
Act #3: Launching the print dialog box;
Act #4: Choosing the print command option.

It can be seen that each one of these acts can be considered a PRE-PRINT act. In the present embodiment, Computer 16 is adapted to detect a user performing ACT #4 and to respond thereto by generating and transmitting a PRE-START signal to Printer 10 over Network 18. Printer 10 responds to receiving the PRE-START signal by moving into a print mode (assuming Printer 10 is in an idle mode when the PRE-START signal is received). This occurs as Computer 16 operates in parallel to generate a print job. Thus, when Printer 10 actually receives the print job, Printer 10 will have at least partially completed the warm-up operation. As a result, print output time is reduced. It is noted that in other embodiments, the computer is adapted to transmit a PRE-START signal upon detecting that other PRE-PRINT acts have been performed. For example, the computer could be adapted to transmit a PRE-START signal upon detecting a user performing Act #1, Act #2 or ACT #3.

It is understood by a person skilled in the art that there are many techniques that can be used to detect the performance of the PRE-PRINT acts mentioned above. For example, the performance of each one of these acts could be detected by operation of one or more software applications executing on the computer. The performance of Act #3 or ACT #4, for example, could be detected by operation of the print driver software.

To illustrate some additional examples of how the PRE-START signal can be generated and used to reduce print output time, consideration is now given to the operation of Scanner Device 32. As previously mentioned, Scanner Device 32 enables a user to generate copies of a printed document. Scanner Device 32 includes a number of standard components. For example, Scanner Device 32 includes Scanner Glass 41 and Scanner Glass Cover 43. In addition, Scanner Device 32 also includes an automatic document feeder (ADF) 39 and User Controls 28. ADF 39 includes an In-Feed Tray 38 and an Output Tray 51.

In order to configure Scanner Device 32 for a scanning operation, a user can interact with User Controls 28. For example, a user can make use of User Controls 28 to set the number of copies that Printer 10 will generate.

In order to scan a single page of a document, the user can lift Cover 43 and place the page onto Scanner Glass 41. The user can then further interact with User Controls 28 to start the scanning operation. In order to scan multiple pages of a document, a user can load some or all of the pages into In-Feed Tray 38. After placing the pages into In-Feed Tray 38 the user can then further interact with User Controls 28 so as to cause ADF 39 to move each page in sequence onto Scanner Glass 41 for scanning. After each page is scanned, the page is then transported to Output Tray 51 wherein the pages can then be collected by the user.

It can be seen therefore, that a user can perform one or more of the following acts to operate Scanner Device 32 in order to submit a print job to Printer 10 for printing:

Act #5: Moving towards Scanner Device 32 (to access Scanner Device 32);
Act #6: Accessing User Controls 28 (i.e., to adjust settings or to start the scanning operation);
Act #7: Loading pages into In-feed Tray 38;

Act #8: Lifting scanner Glass Cover 43 (to place a page for scanning onto the Scanner Glass for scanning).

It can be seen that each one of these acts can also be considered a PRE-PRINT act. In the present embodiment, Scanner Device 32 is adapted to detect a user performing Act #7 or ACT #8. In addition, Scanner Device 32 is adapted to respond to the detection of the performance of these acts by transmitting a PRE-START signal to Printer 10. This causes Printer 10 to begin moving into a print mode (assuming Printer 10 is in an idle mode when the PRE-START signal is received) while the user further interacts with Scanner Device 32 so as to start the scanning operation. Therefore, when Printer 10 receives the print job from Scanner Device 32, it is likely that Printer 10 will have at least partially completed the warm-up operation or will have already entered the print mode. As a result, print output time is reduced.

It is noted that in other embodiments, the scanner device is adapted to transmit a PRE-START signal upon detecting that other PRE-PRINT acts have been performed, such as Act #5 or Act #6.

It is understood by a person skilled in the art that there are many techniques that can be used to detect the performance of the PRE-PRINT acts just listed. For example, Act #5 can be detected by a sensor system incorporated into the scanner that can sense the presence of a human within a certain proximity of the scanner device. These sensor systems can include a motion detector (e.g., an infrared motion sensor) or a sound sensor (e.g., to sense the sound of a human moving towards the scanner, a human voice or a particular voice command). In addition, the performance of Act #5 could detected by a sensor system that can sense a human touching one or more outer areas of Scanner Device 32. The performance of Act #6 can be detected by sensor systems that can sense when one or more keys in User Controls 28 are pressed. The performance of Act #7 can be detected by sensor systems that can detect the presence of one or more pages in the In-feed Tray 38. This sensor system could include one or more optical or mechanical sensors appropriately positioned to detect the loading of a page into the In-feed Tray 38. The performance of Act #8 can be detected by sensing systems that include one or more optical or mechanical sensors positioned so as to detect the lifting of the scanner cover.

As just shown, the present invention provides printers and printing systems that have reduced print output time. In part this is accomplished by providing printers that initiate a warm-up operation, if the printer is in an idle mode, upon receiving a PRE-START signal. In a second aspect of the present invention, printers are also provided that are adapted to remain in a print mode for an extended period of time upon receiving the PRE-START signal.

As previously indicated, printers are typically adapted to move from a print mode into an idle mode if inactive over a certain period of time. This can result, for example, in reducing power consumption. It can be undesirable, however, for a printer to move from a print mode into an idle mode if shortly thereafter a print job is then received. In a second aspect of the present invention, printers are provided that are adapted to extend the amount of time it remains inactive while in a print mode upon receiving a PRE-START signal. For example, in the embodiment just described Control Unit 11 can be further adapted to cause Printer 10 to remain in a print mode for an additional length of time while inactive upon receiving a PRE-START signal. Thus, this can prevent Printer 10 from moving into an idle mode if a print job is about to be received.

Figure 3:
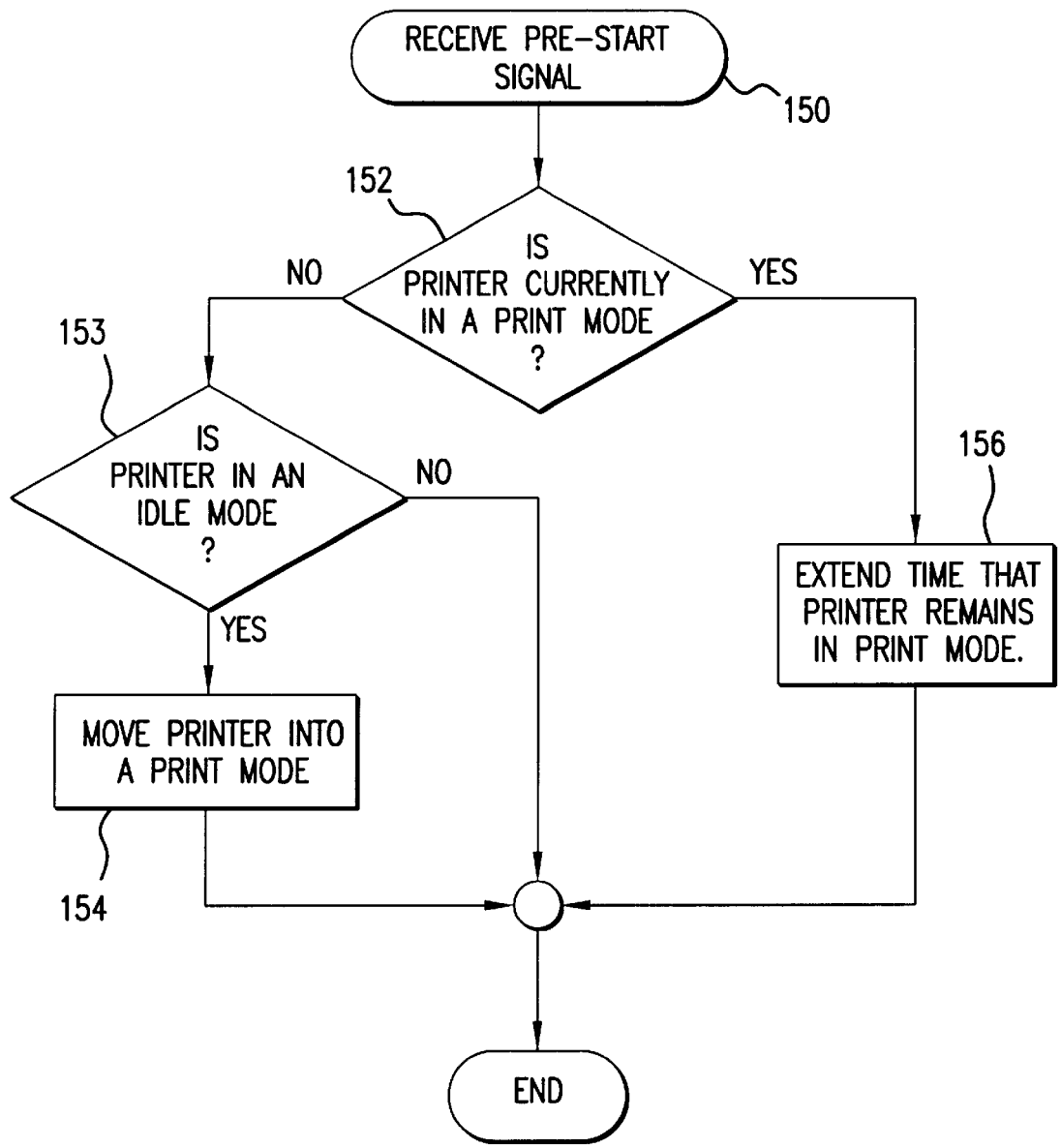
FIG. 3 illustrates a series of steps that can be performed by a printer control system in response to the printer receiving a PRE-START signal.

This aspect of the present invention is further described in the form of yet another embodiment of the present invention which is depicted in FIG. 3. FIG. 3 illustrates a series of steps in a control procedure that can be performed by a printer control system in response to the printer receiving a PRE-START signal (start step 150). After the PRE-START signal is received, a determination is made as to whether the printer is currently in a print mode (decision step 152). If the printer is in a print mode, the time that the printer remains in the print mode while inactive is extended (step 156) and the control procedure is completed. If, however, the printer is not in a print mode (decision step 152) a determination is then made as to whether the printer is in an idle mode (decision step 153). If not (e.g., the printer is currently performing a warm-up operation) then the control procedure is completed. If, however, the printer is currently in an idle mode then the printer is moved into a print mode by initiating a warm-up operation (step 154) and the control procedure is completed.

It should be understood that the foregoing description is only illustrative of the invention. Various alternatives and modifications can be devised by those skilled in the art without departing from the invention. Accordingly, the present invention is intended to embrace all such alternatives, modifications and variances that fall within the scope of the appended claims.

What is claimed is:

1. A printing system comprising:
   a printer having an idle mode of operation and a print mode of operation; and
   a personal computer connected to said printer and operable by a user to generate and to transmit a print job to said printer, said computer being adapted to detect the user performing a PRE-PRINT act associated with the generation of the print job and is responsive thereto by transmitting a signal to said printer prior to transmitting the print-job to the printer; and wherein the printer is responsive to receiving the signal while operating in the idle mode by moving into the print mode.

2. A method of controlling whether a printer operates in a print mode or in an idle mode, said method comprising the steps of:
   (a) determining that the printer has received a signal from a personal computer, the signal indicating the computer has detected a human user performing a PRE-PRINT act associated with a generation of a print job; and
   (b) responding to the signal by moving the printer into a print mode; and wherein step (a) and step (b) are each performed prior to the printer receiving the print job.

3. The method of claim 2, wherein the PRE-PRINT act is the act of launching a print dialog box.

* * * * *